United States Patent [19]

Le Pabic et al.

[11] 4,158,108
[45] Jun. 12, 1979

[54] DIGITAL DATA RESYNCHRONIZATION DEVICE

[75] Inventors: Jean-Pierre Le Pabic, Rueil-Malmaison; Jean-Louis Y. C. Moreau, Bures sur Yvette, both of France

[73] Assignee: Le Material Telephonique, Boulogne-Billancourt, France

[21] Appl. No.: 871,955

[22] Filed: Jan. 24, 1978

[30] Foreign Application Priority Data

Jan. 28, 1977 [FR] France ............................... 77 02415

[51] Int. Cl.² ............................................... H04J 3/06
[52] U.S. Cl. ............................ 179/15 BS; 179/15 AF
[58] Field of Search ........................ 179/15 AF, 15 BS

[56] References Cited

U.S. PATENT DOCUMENTS

| | | | |
|---|---|---|---|
| 3,928,726 | 12/1975 | Colton et al. | 179/15 BS |
| 3,928,727 | 12/1975 | Roche | 179/15 BS |
| 4,086,437 | 4/1978 | Henrion et al. | 179/15 AF |

*Primary Examiner*—Thomas A. Robinson
*Attorney, Agent, or Firm*—Roland Plottel

[57] ABSTRACT

A digital data resynchronization device used as an interface circuit between the incoming junctions of a PCM switching center and the time division switch. It possesses a memory that contains one-bit words loaded at the rate of the incoming data and read at the rate of the local clock. As a means of avoiding conflict due to simultaneous read-and-write operations, two time slots in the local clock cycle are provided for write operations and one time slot for read operations.

Application: RCM switching.

8 Claims, 10 Drawing Figures

DIGITAL DATA RESYNCHRONIZATION DEVICE

The present invention relates to a digital data resynchronization device possessing "n" ("n" being an integer greater than zero) input circuits, each having a first input terminal for receiving binary data in serial form at the rate of clock signals received on a second terminal, and also a first output terminal for producing the resynchronized data at the rate of a local clock, each of the input circuits possessing an input memory whose data input is connected to the first input terminal, whose output is connected to the output terminal and with which are associated a write address code circuit incrementing at the rate of the received clock and a read address code circuit incrementing at the rate of the local clock.

Such a device has important applications in the field of telecommunications, particularly when it is used in a telephone exchange for time-division multiplexed channels. Refer, for example, to the article by A. ROCHE, M. A. HENRION and A. COUDRAY published in the SOCOTEL review no. 51, October 1975, and entitled "Réalisation d'un interface de communication MIC à faible dissipation" (Construction of a low power consumption PCM multiplexing interface).

In this device, each input terminal is connected to a junction for PCM signals organized in frames in accordance with CEPT recommendations. In order to contain a signal frame, the input memory is organized in eight-bit words. It is necessary to place each word entering this memory at a location defined by its position in the frame, implying a synchronization circuit at each input terminal in order to determine the word positions in the frame.

In this known device, the phase jitter between the received clock signals and the local clock signals is poorly compensated. It cannot exceed the duration of two words, i.e. the duration of 16 bits.

Moreover, as a means of avoiding conflict due to simultaneous read and write operations, the input memory may be read during one or two time slots of the local clock cycle. In order to produce the read data always at the same instants during a cycle, it is necessary to provide two parallel/parallel registers.

The invention therefore proposes a digital data resynchronization device that allows much greater compensation for phase jitter than the device mentioned above and for which the presence of two parallel/parallel registers is no longer indispensable.

For this purpose, the digital data resynchronization device is characterized by the fact that the input memory is a one-bit word memory with which are associated a write circuit for enabling write operations during at least two time slots of the local clock cycle and a read circuit for controlling read operations during another time slot of the local clock cycle, and by the fact that a code difference circuit is provided such that the read and write address codes are different.

One advantage of the invention lies in the fact that it is not necessary to provide a synchronization circuit for each input terminal. This advantage is apparent in one characteristic of the invention relating to a digital data resynchronization device possessing a plurality of input circuits, the outputs of the input memories of the input circuits being connected to the first output terminal via a multiplexer controlled by the local clock and for which the data are arranged in frames and identified by the frame codes. In accordance with this characteristic, the data resynchronization device possesses a synchronization sequential circuit operating in conjunction with a frame synchronization code detector connected to the input circuits via the multiplexer, an identification code sequential circuit for producing the resynchronized data identification codes on a second output terminal, and a memory for containing the data relating to the states of the said sequential circuits, the address codes of this memory being generated by the local clock in correspondance with the signals controlling the multiplexer.

It is thus apparent that the advantage mentioned above results in saving a large number of circuits in the application considered in the said article, because only one synchronization circuit is required, whereas in the device described, there are eight or sixteen.

The characteristics of the present invention may be understood from the following description together with the appended drawings, both description and drawings being given as a non-limiting example.

FIG. 1 is a diagram of a synchronization device in accordance with the invention.

FIG. 2 indicates the organization of the received signal frames.

The synchronization device considered in this example is used to operate in conjunction with a time-division telephone exchange. Such an exchange is described in the article by P. VOYER, A. REGNIER, K. KEVORKIAN and J. P. LAGER entitled "Réseau de connexion pour grands centres temporels" (Switching network for large-time division exchanges) published in the "Commutation et Electronique" review no. 49, April 1975. As indicated in this article, the resynchronization device serves as the switching interface.

Figure 1:
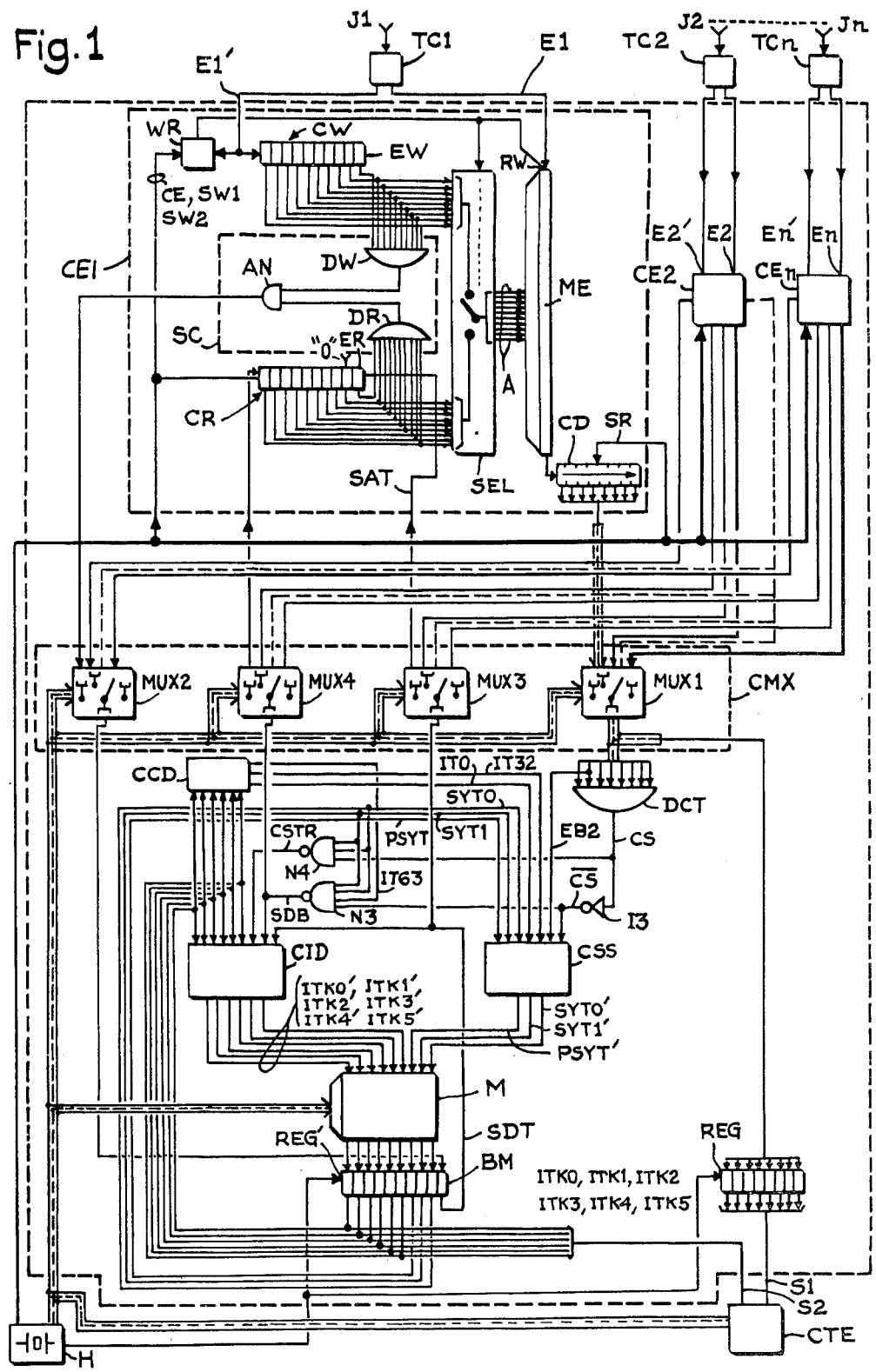
Figure 2:
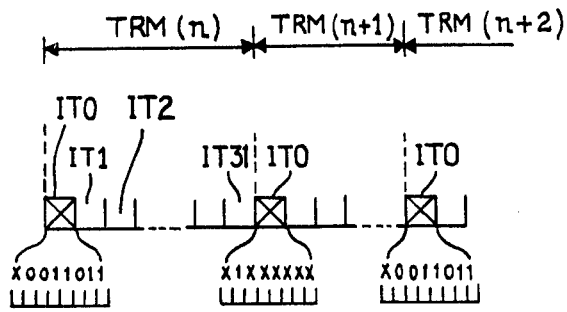

The device shown in FIG. 1 possesses "n" input circuits CE1, CE2, ..., CEn, each of which is assigned to a pulse code modulation signal junction, known as a PCM junction, J1, J2, ..., Jn. The signals on these junctions are organized in frames TRM in accordance with the recommendations of the CEPT, as illustrated in FIG. 2. Each frame possesses thirty-two time slots IT0, IT1, IT2, ..., IT31, the duration of each being sufficient to allow the transmission of eight serial bits. The time slot IT0 is used for transmitting a frame synchronization code every other frame (frames TRM(n) and TRM(n+2)) consisting of a series of bits "x0011011", the value of bit x being indifferent, and during the other frame TRM(n+1) the series "x1xxxxxx". In the latter case, it is seen that the second bit only is meaningful. Each time slot occupying the same place in successive frames defines a channel.

The data transmitted by junctions J1, J2, ..., Jn are encoded in accordance with the well-known HBD3 code, and before being applied to the input circuits, it is necessary to convert them to binary code. For this purpose, transcoders TC1, TC2, ..., TCn are provided. These transcoders produce the signals transcoded to binary code on first outputs connected to first input terminals E1, E2, ..., En of input circuits CE1, CE2, ..., CEn, and restored clock signals, i.e. signals synchronous with the input signals, on second input terminals E1', E2', ..., En'.

The data appear in parallel on termnal S1 at the rate determined by clock H of the exchange with which the resynchronization device is operating.

The resynchronized data are fed to an incoming time-division switch CTE.

The input circuits CE1, CE2, ..., CEn are of identical structure and for this reason circuit CE1 only is described in detail. This circuit consists of a memory ME. As a means of writing data into this memory, a write address code circuit consisting of a counter CW is used, and for reading this memory, a read address code circuit consisting of a counter CR is used. Counter CW counts the signal pulses applied to E1', whereas counter CR counts those produced by the local clock H. The memory possesses a read/write control circuit RW. The signals applied to this control input should be coherent with those applied to an address code selector SEL which, from the values produced by counters CW and CR, produces the appropriate code for the address code inputs A of memory ME.

Figure 3:
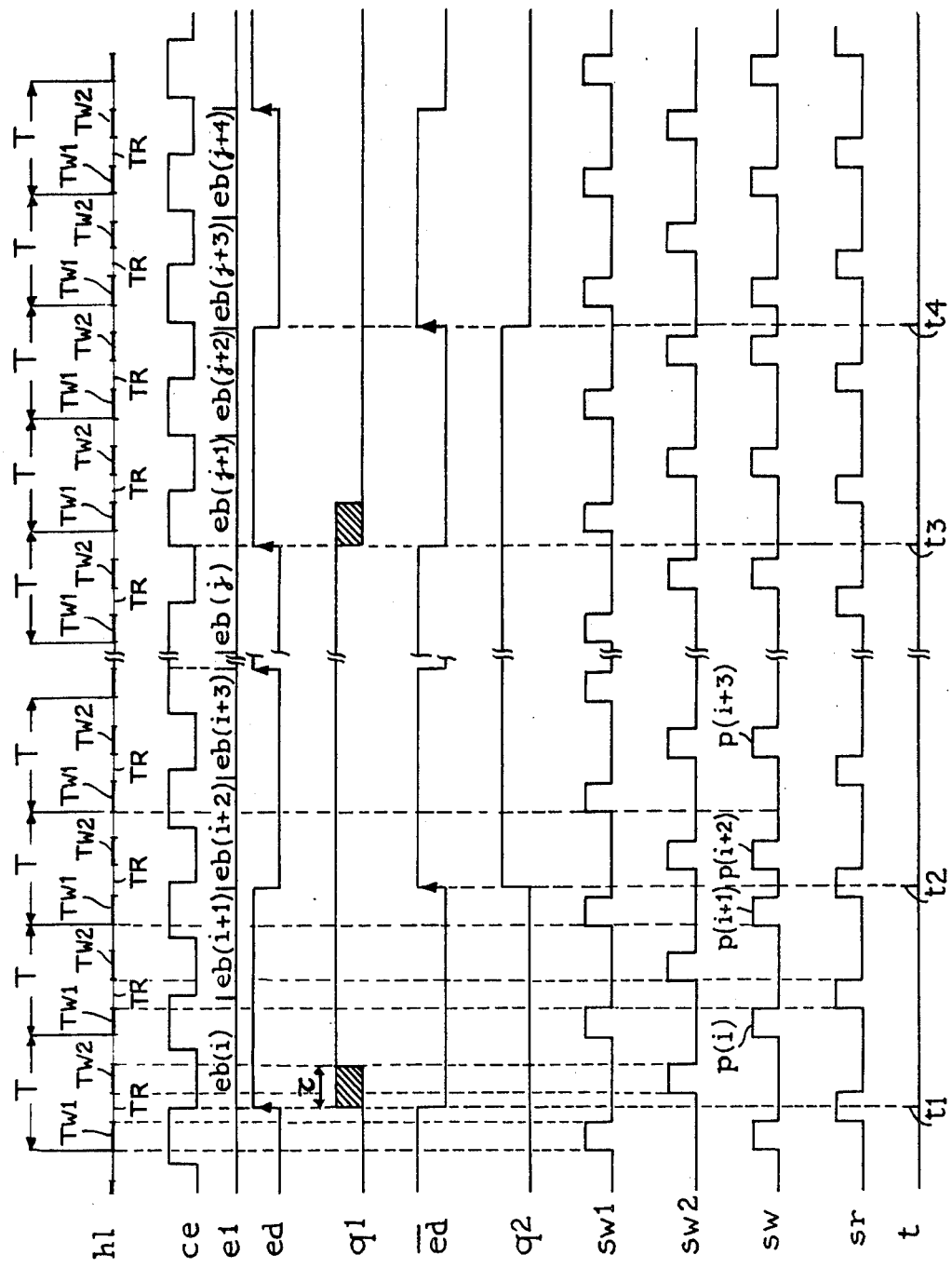
FIG. 3 is a timing diagram explaining the operation of the write circuit when the received data rate exceeds the local clock frequency.
Figure 4:
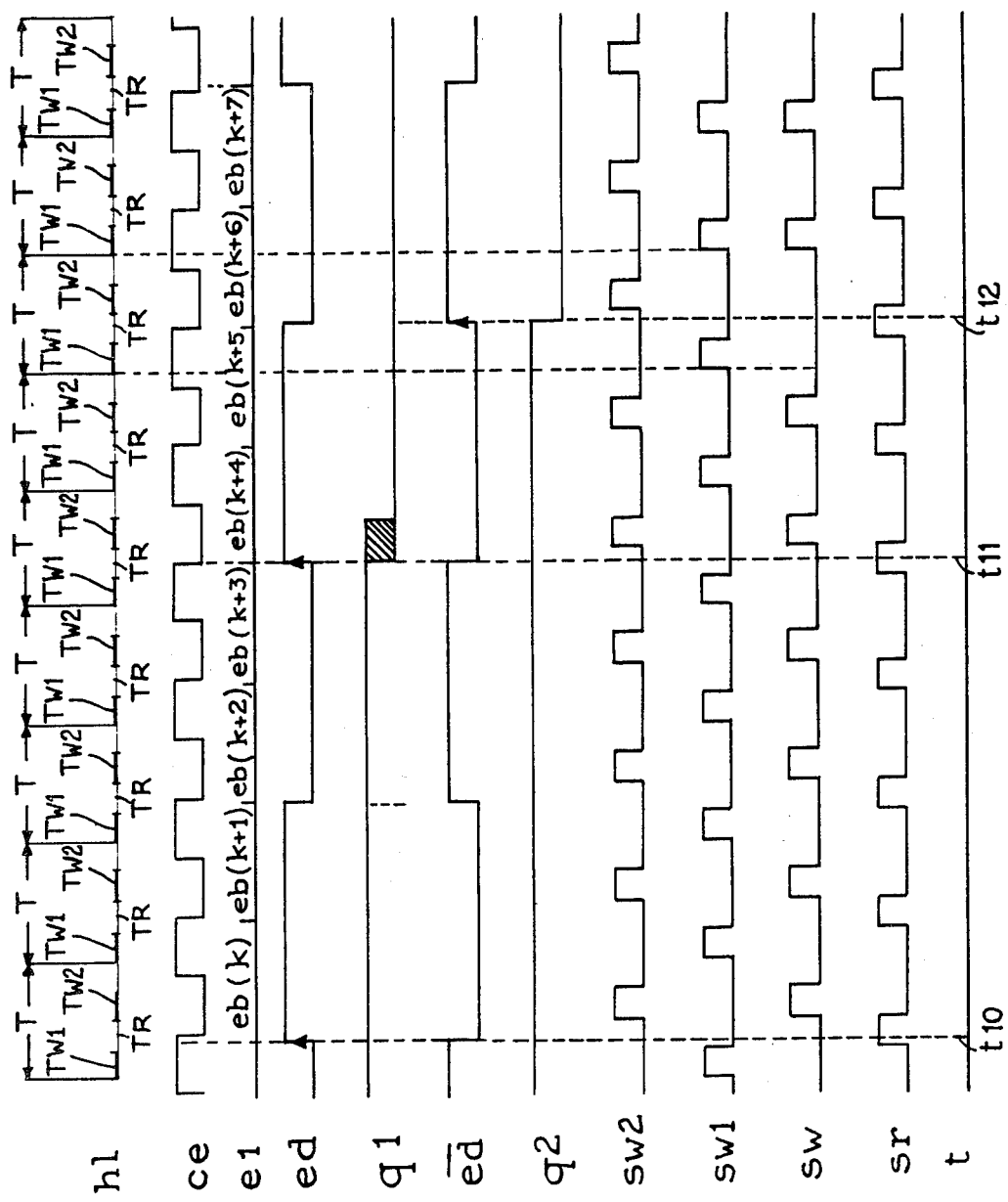
FIG. 4 is a timing diagram explaining the operation of the write circuit when the received data rate is less than the local clock frequency.

In accordance with the invention, memory ME is a one-bit word memory with which are associated a write circuit WR for enabling write operations during at least two time slots TW1 and TW2 (see line hl in FIGS. 3 and 4) of the local clock cycle having a duration T, and also a read circuit for ordering read operations during another time slot TR of the local clock circuit. This read circuit consists of the shift register CD, whose input is connected to the output of memory ME and which is fed with the shift signal sr present on a wire SR. These signals sr, as seen in FIGS. 3 and 4, correspond to the read time slots TR.

In addition, a code difference circuit SC is provided for detecting the increase or decrease in the difference between the codes produced by CW and CR and for operating on one of the counters (counter CR in the present example) in order to maintain a certain difference between these two codes.

The data are thus stored in memory ME bit by bit as they occur on input E. Because the switch CTE acquires data in the form of parallel bytes, however, the shift register CD converts the data obtained from the memory from serial to parallel form. The parallel outputs of register CD are connected to the switching circuit CTE via a multiplexer MUX1 forming part of a multiplexing circuit CMX and via a buffer register REG.

During one multiplexing cycle, the input of multiplexer MUX1 is connected in turn to the different outputs of the shift registers contained in the difference circuits CE1, CE2, ..., CEn. Multiplexer MUX1 is controlled by the signals obtained from clock H.

In accordance with a second characteristic of the invention, the synchronization device possesses an identification code sequential circuit CID, a synchronization sequential circuit CSS operating in conjunction with a frame code detector DCT, and a memory M for containing the data relating to the states of the said sequential circuits, the address codes of this memory M being generated by a clock H in correspondence with the control signal of the multiplexing clock CMX.

A register REG' is provided on the output of memory M with its outputs connected to wires ITK0 to ITK5. These wires constitute output S2 of the device in accordance with the invention and carry the data relating to the identification codes determining the time slot or the channel to which the byte contained in register REG belongs. The two registers REG and REG' are controlled in synchronism such that the byte and its identification code are transmitted simultaneously to the time-division switch CTE.

The operation of the resynchronization device is described in greater detail below.

(1) Write Circuit

Figure 5:
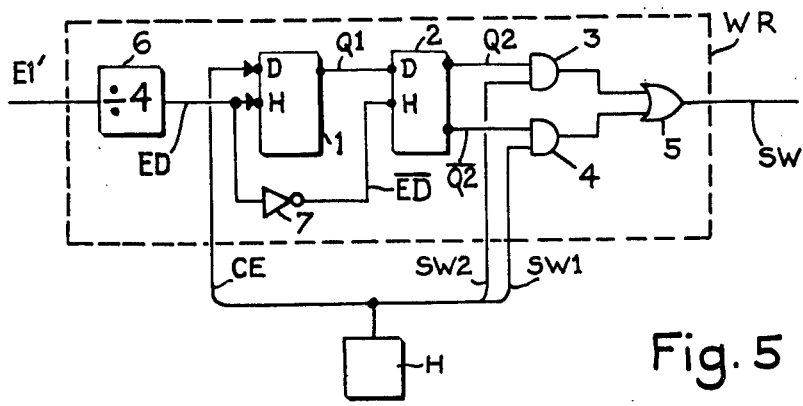
FIG. 5 is a diagram illustrating the write circuit in detail.

The write circuit illustrated in detail in FIG. 5 consists firstly of two type D flip-flops 1 and 2. Each of these flip-flops transfers the logic signal present on its input D to its output on the rising edge of the signal applied to its input H. Output Q1 of flip-flop 1 is connected to input D of flip-flop 2. Outputs Q2 and Q2 of this flip-flop 2 are connected to the first inputs of AND gates 3 and 4 respectively, the outputs of these gates being connected to the two inputs of an OR gate 5. The output of this OR gate 5 constitutes output SW of circuit WR. The second inputs of the AND gates 3 and 4 are fed via wires SW1 and SW2 with signals sw1 and sw2 respectively, these signals corresponding to the write instants TW1 and TW2. The circuit consisting of gates 3, 4 and 5 constitutes a form of switching circuit controlled by the output circuit of flip-flop 2. The wave-forms of these signals are shown in FIGS. 3 and 4 in lines sw1 and sw2. Inputs H of flip-flops 1 and 2 are connected to the output of a divide-by-four frequency divider 6, whilst input H of flip-flop 2 is connected to the output of an inverter 7, whose input is connected to the output of divider 6. The input of divider 6 is fed with the restored clock signals applied to terminal E1' and input D of flip-flop 1 is fed with the signals present on a wire CE connected to the output of clock H.

It is known that type D flip-flops respond erratically to signal transistion applied simultaneously to their inputs D and H, the output signal assuming for a certain time ill-defined or oscillating values. This behaviour is known as the glitch phenomenon. The write circuit WR shown in FIG. 5 avoids the undesirable effects of glitch.

The operation of the write circuit is now described with the help of FIGS. 3 and 4. The lines in these figures are identified by the signals they represent.

FIG. 3 relates to the case where the received data rate exceeds the local clock frequency. Line hl indicates the distribution of the write instants TW1 and TW2 and the write instant TR within a clock cycle of duration T. Line ce shows a signal produced by clock H and possessing a period T. This signal is a logical "1" during the interval starting just before instant TW1 and ending slightly later. Line e1 indicates a succession of bits eb(i) to eb(i+3) and eb(j) to eb(j+4). These bits are received on terminal E1. Signal ed synchronous with the appearance of these bits has a period equal to four times the duration of one bit. The signal shown in line ed is the same signal in complemented form. Lines sw1, sw2 and sr show the pulses corresponding to the read and write instants TW1, TW2 and TR. FIG. 3 also possesses a time scale t for indicating the instants used for explaining operation.

Thus at instant t1, a transition of signal ce applied to input D of flip-flop 1 is coincident with a transition of signal ed applied to input H. This provides the conditions in which glitch may occur. For a period τ, signal q1 on the output of the flip-flop is indeterminate, as indicated in the figure by a shaded area, and after this time, it assumes either value "1" or "0". In the case shown in FIG. 3, it assumes the value "1". At instant t2, a rising edge of signal ed appears, such that signal q2 on the output of flip-flop 2 assumes the value of signal q1, i.e. "1". It is seen that the rising edge of signal $\overline{ed}$ appears only at an instant clearly following the glitch effect.

In the case shown in FIG. 3, the value of signal q2 before instant t1 was b "0". Gate 3 (FIG. 5) was closed and gate 4 open. Signal sw, which was simply signal sw1, was obtained on output SW of the write circuit. At instant t2, signal q2 changes sign, with the result that signal sw is signal sw2, such that during a clock cycle data are written at two different instants into memory ME, these operations being performed at instants TW1 and TW2.

Because the received data rate exceeds the local clock frequency, the rising edge of signal ed, which corresponds to the falling edge of signal ce at instant t1, will finally correspond to the rising edge of this signal at instant t3. Once again, the glitch effect is encountered, as indicated by the shaded area. If it is assumed that signal q1 finally takes the value "0", when the rising edge of signal $\overline{ed}$ occurs at instant t4, signal q2 assumes the value "0", causing the pulses of signal sw1 to appear on output SW of the write circuit. It is seen that each pulse on output SW corresponds to a bit present on terminal E1. Pulse p(i) thus allows the storage of bit eb(i), pulse p(i+1) allows the storage of bit eb(i+1), etc.

FIG. 4 relates to the case where the bit duration exceeds the local clock cycle duration T. Line e1 shows a series of bits eb(k), ..., eb(k+7) corresponding to this case. In this figure, if the value of signal q1 on the output of flip-flop 1 and the value of signal q2 on the output of flip-flop 2 are "1"s before instant t10 at which a transition of signal $\overline{ed}$ occurs, the signal on the output of the write circuit is signal sw2. At instant t10 at which a rising edge of signal $\overline{ed}$ occurs, it is seen that this transition appears at an instant when signal ce is a logical "1". The signal on the output of flip-flop 1 thus remains a logical "1", with the result that there is no change in operation. At instant t11, transitions of signals ed and ce occur simultaneously, which may give rise to glitch. The interval during which this phenomenom may occur is shown by the shaded area in FIG. 3. After this interval, it is assumed that signal q1 takes the value "0". When a rising edge of signal $\overline{ed}$ occurs at instant t12, signal q2 assumes the value "0", such that signal sw1 is obtained on the output of the write circuit.

It is seen that in this case there is no write operation during a local clock cycle of duration T identified by T*.

(2) Code Difference Circuit

In the present example, use is made of a 512 one-bit memory corresponding to the number of bits contained in two 32-channel frames consisting of eight-bit time slots. Nine-bit codes are required for addressing this memory.

Figure 6:
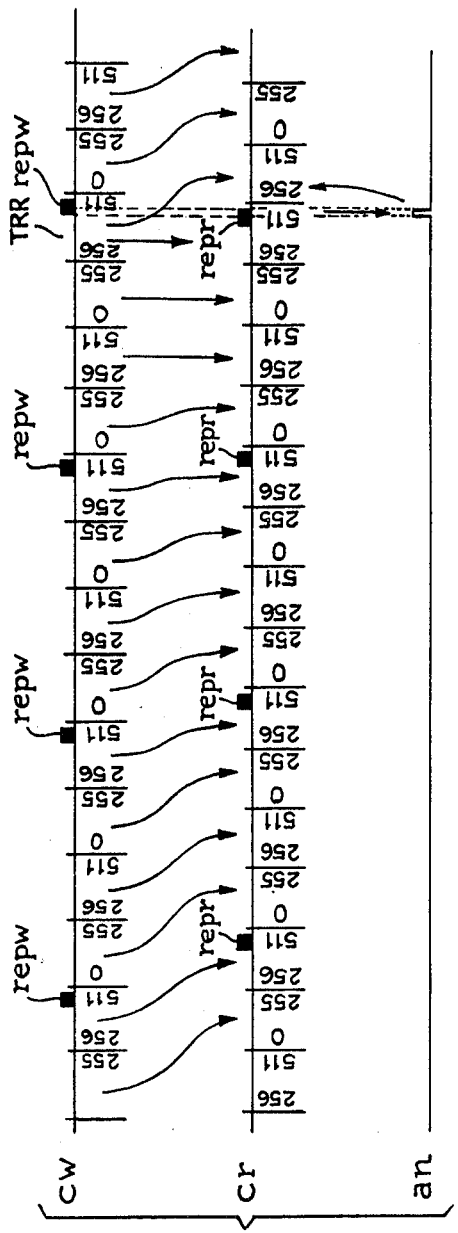
FIG. 6 is a timing diagram showing how frame repetition is obtained.
Figure 7:
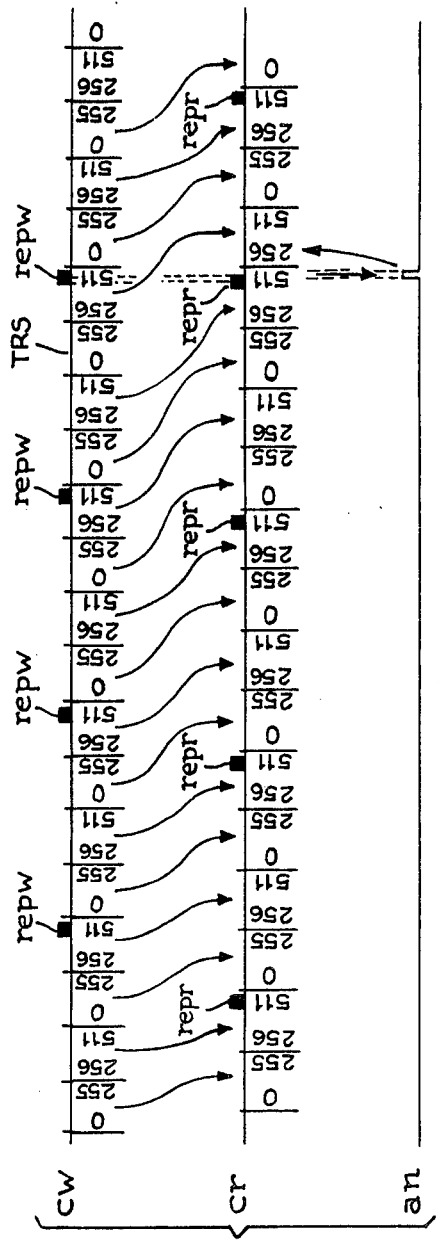
FIG. 7 is a timing diagram showing how a frame skip is produced.

The code difference circuit SC possesses two decoders DW and DR. The inputs of these decoders are connected to the outputs of counters CW and CR, which produce the memory ME read and write address codes. Other inputs of these decoders are connected to the outputs of one of the additional stages EW and ER appended to counters CW and CR respectively. The purpose of these decoders is to produce the reference signals repw and repr respectively. As shown in FIGS. 6 and 7, this reference is represented by black rectangles. The first line cw of FIG. 6 thus shows the contents of counter CW, which varies between 0 and 511. The divisions beneath the line indicate two groups of bits, i.e. those stored by address codes 0 to 255 and those stored by address codes 256 to 511. Each of these two groups corresponds to the number of bits contained in a frame. The identification code repw appears on the output of the decoder shortly before the contents of counter CW reach for the second time the binary value equivalent to 512.

The second lines cr of FIGS. 6 and 7 show the same indications relating in this case to counter CR. The signal produced by decoder DR is identified by repr. When coincidence occurs, an AND gate AN produces a signal an of value "1", which is stored by a flip-flop BM forming part of the register REG'. This signal of value "1" is then applied to the incrementing input of counter CR, such that the contents 111111111 of this counter just before the application of this signal becomes 011111111 because of a permanent "0" applied to the input of the most significant bit flip-flop of counter CR. The contents then become 100000000 at the next pulse, i.e. a decimal value of 256.

FIG. 6 shows the case where counter CR increments at a higher rate than counter CW.

The data previously loaded into memory ME cannot be read, with the result that as counter CR varies from 0 to 255 the data stored as counter CW varied from 0 to 255 are read. This is shown in FIGS. 6 and 7 by the vertical arrows inclined from left to right. It is seen in FIG. 6 that the appearance of signal an results in rereading the bits represented by TRR and which were stored when counter CW varied from 255 to 511.

FIG. 7 illustrates the opposite case, i.e. counter CR incrementing at a slower rate than counter CW. This corresponds to the case of a skipped frame, indicated by TRS in the figure.

Thus in all cases, the two codes produced by counters CR and CW are separated after detecting coincidence between the two reference signals repw and repr by a value of 256.

(3) Synchronization Search

The various digital samples fed to the incoming time-division switch CTE must be coherent, i.e. correspond to one well defined time slot and not to two. Following the multiplexing performed by circuit CMX, the data contained in register CD must be correct at the instant the multiplexer connects register CD to the incoming time-division switch. At this instant, for example, register CD should not contain simultaneously data corresponding to a time slot and data corresponding to the next time slot. As the clock controlling the multiplexing circuit CMX is the same as that incrementing counter CR, action is brought to bear on the latter in such a way that at the instant register CD of circuit CE1, for example, is connected to the switch CET1, the eight bits contained in register CD correspond to one and the same time slot.

Figure 8:
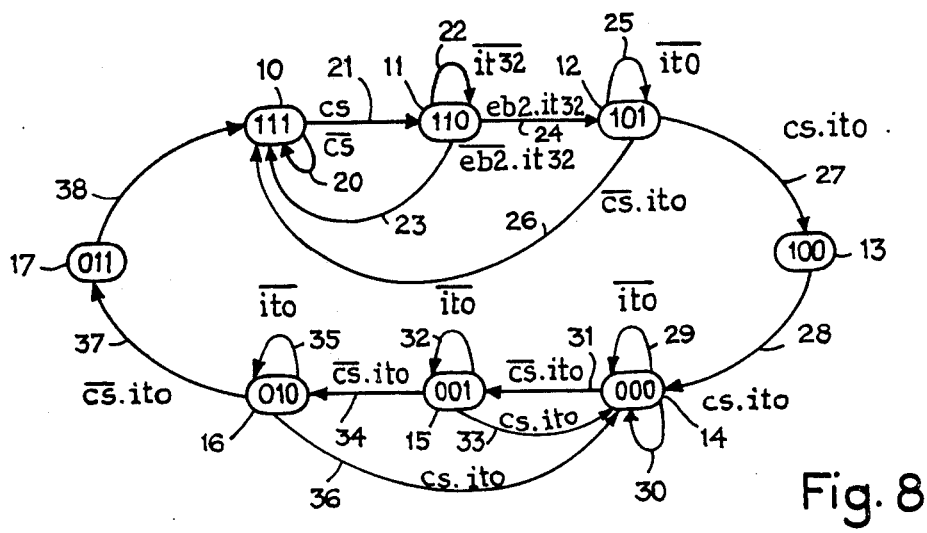
FIG. 8 is a diagram indicating the states of the synchronization sequential circuit.

For this purpose, use is made of a frame synchronization code detector that produces on a wire CS a signal cs of value "1" when the frame synchronization code is contained in register CD. An inverter I3 produces on a wire $\overline{CS}$ the complemented signal $\overline{cs}$. The detector output is connected to one input of the sequential circuit CSS producing on three output wires PSYT', SYT1' and SYT0' three signals indicating the status of this circuit. The various possible states of this circuit are shown in FIG. 8.

Each state is represented by a three-bit number shown in a circle. The first bit on the left indicates the logical value of signal psyt' available on wire PSYT' connected to the output of circuit CSS. The second bit is the logical value of signal syt1' available on wire SYT1', whereas the third bit is the logical value of signal syt0' available on wire SYT0'. The signals present on these wires PSYT', SYT1' and SYT0' are stored in memory M at a given location corresponding to the input circuits CE1, ..., CEn and at an instant at which the multiplexing circuit CMX connects one of these circuits to the switch CTE. Register REG connected to the output of memory M thus contains for certain of its configurations the values of the signals which were present during a previous cycle on wires PSYT', SYT1' and SYT0'. These values are made available on wires PSYT, SYT1 and SYT0. The different variables on which depends the state of circuit CSS are the following:

it0 which assumes the logical value "1" when the bits contained in register CD are presumed to be those belonging to time slot IT0 (see FIG. 2) of a frame;

it32 which assumes the logical value "1" when the bits contained in register CD are presumed to belong to time slot IT0 of the next frame;

$\overline{cs}$ which assumes the value "0" as described above when the frame code is contained in register CD;

eb2 which assumes the value "1" every other frame when the frame code is not contained in time slot IT0;

psyt, syt1 and syt0 which are the former status variables obtained from memory M.

The various states of circuit CSS shown in FIG. 8 are numbered 10, 11, 12, 13, 14, 15, 16, and 17. State 10 is that indicating synchronization loss, i.e. the necessity of finding the frame code.

If the frame code is found after this state 10, i.e. $\overline{cs}$="1", circuit CSS changes to state 11. Otherwise, it remains in state 10. When in state 10, sty1'=sty0'="1". For this reason, a NAND gate N3 whose three inputs are connected to wires SYT0, SYT1 and CS', and of which a fourth input is connected to a wire IT63, produces on a wire $\overline{SDB}$ a signal $\overline{sdb}$ fed to counter CR via a demultiplexer MUX4 forming part of the multiplexing circuit CMX. When active, i.e. when this signal is a logical "0", it inhibits counter CR, such that a one-bit shift occurs in register CD. Signal it63 on wire IT63 changes to a logical "1" when 64 time slots have been counted from the time slot presumed to be IT0. In order to feed the output signal of gate N3 to the counter, variable sdb checks the following relationship:

$$sdb = it63.syt0.syt1.\overline{cs} \qquad (1)$$

Thus during successive multiplexing cycles, this signal sdb is fed several times to counter CR, in such a way that the frame code is finally contained in register CD. In this case, cs="1", relationship (1) is invalidated and circuit CSS changes to state 11. It remains in this state until it32 becomes a logical "1" and the value of eb2 is examined. If the latter is a logical "1", i.e. eb2.it32="1", the circuit is approaching synchronization and changes to state 12. If on the other hand it is a logic "0", i.e. $\overline{eb2}$.it32="1", it is assumed that an error occurred in determining the frame code, i.e. digital signal immitating the frame code has been detected, and the circuit switches to state 10.

When the circuit is in state 12, it waits for signal it0 to assume the logical value "1" and checks if the frame code is contained in register CD. If this is the case, i.e. if CS.IT0="1", the circuit changes to state 13 and then, after a clock cycle, to state 14. It is assumed that synchronization is achieved in state 14. A check is then made as to whether the frame code then occurs in the time slots where it0="1" (every other frame). If the frame code is not contained in register CD, $\overline{cs}$.it0 then equals "1", and the circuit changes from state 12 to state 10.

When the circuit is in state 14 and the frame code is not found in register CD, $\overline{cs}$.it0 then equals "1", and the circuit changes to state 15.

In state 15, it is still made as to whether the frame code is contained in the register when it0="1". If this code is found, $\overline{cs}$.it0="1" and the circuit returns to state 14. If it is not found, $\overline{cs}$.it0="1", and the circuit changes to state 16.

When the circuit is in state 16, the same test is performed, i.e. cs.it0 "1," and the circuit then returns to state 14, i.e., cs.it0="1." The circuit then changes to state 17 and during the next multiplexing cycle changes to state 10.

Circuit CSS is a read-only memory, which is easily programmed as a function of the above description. The following table shows the correspondence between the input and output variables. The reference numbers in the last column of the table refer to the arrows in FIG. 5.

TABLE I

| Input Variables | | | | | | | Output Variables | | | References (figure 8) |
|---|---|---|---|---|---|---|---|---|---|---|
| cs | it0 | eb2 | it32 | psyt | syt1 | syt0 | psyt' | sytl' | syt0' | |
| 0 | X | X | X | 1 | 1 | 1 | 1 | 1 | 1 | 20 |
| 1 | X | X | X | 1 | 1 | 1 | 1 | 1 | 0 | 21 |
| X | X | X | 0 | 1 | 1 | 0 | 1 | 1 | 0 | 22 |
| X | X | 0 | 1 | 1 | 1 | 0 | 1 | 1 | 1 | 23 |
| X | X | 1 | 1 | 1 | 1 | 0 | 1 | 0 | 1 | 24 |
| X | 0 | X | X | 1 | 0 | 1 | 1 | 0 | 1 | 25 |
| 0 | 1 | X | X | 1 | 0 | 1 | 1 | 1 | 1 | 26 |
| 1 | 1 | X | X | 1 | 0 | 1 | 1 | 0 | 0 | 27 |
| X | X | X | X | 1 | 0 | 0 | 0 | 0 | 0 | 28 |
| X | 0 | X | X | 0 | 0 | 0 | 0 | 0 | 0 | 29 |
| 1 | 1 | X | X | 0 | 0 | 0 | 0 | 0 | 0 | 30 |

TABLE I-continued

| Input Variables | | | | | | | Output Variables | | | References (figure 8) |
|---|---|---|---|---|---|---|---|---|---|---|
| 0 | 1 | X | X | 0 | 0 | 0 | 0 | 0 | 1 | 31 |
| X | 0 | X | X | 0 | 0 | 1 | 0 | 0 | 1 | 32 |
| 1 | 1 | X | X | 0 | 0 | 1 | 0 | 0 | 0 | 33 |
| 0 | 1 | X | X | 0 | 0 | 1 | 0 | 1 | 0 | 34 |
| X | 0 | X | X | 0 | 1 | 0 | 0 | 1 | 0 | 35 |
| 1 | 1 | X | X | 0 | 1 | 0 | 0 | 0 | 0 | 36 |
| 0 | 1 | X | X | 0 | 1 | 0 | 0 | 1 | 1 | 37 |
| X | X | X | X | 0 | 1 | 1 | 1 | 1 | 1 | 38 |

(4) Identification Code Circuit CID

The identification code of the sample fed to the incoming time-division switch appears in binary form on wires ITK0, ITK1, ITK2, ITK3, ITK4 and ITK5. This identification consists of determining the time slot in which the sample lies with respect to the frame code. Code "000000" thus corresponds to time slot IT0, and code "000001" to time slot IT1. Such a circuit should thus increment these codes by one at each multiplexing cycle. In the case of synchronization loss, however, it is necessary to control this circuit in such a way that the output codes are correct. Thus when a search is made for the frame code, the output is "000000". once the frame code has been found, it is set to "000001," and when it is necessary to skip a frame, table II gives the correspondance between the input and output variables.

The input variables are:

itk0, itk1, itk2, itk3, itk4 and itk5 obtained from register REG' and are available on wires ITK0, ITK1, ITK2, ITK3, ITK4 and ITK5 respectively;

sdb produced by gate N3;

sdt produced by flip-flop BM of register REG';

cstR produced by a NAND gate N4, whose inputs are connected to wires SYT0, SYT1 and CS.

An encoding circuit CCD generates signals it0, it32, and it63. In order to obtain signal it0, it is merely necessary to decode "000000" available on wires ITK5 to ITK0, in order to obtain signal it32 it is merely necessary to decode "100000", and in order to obtain signal it63 it is merely necessary to decode "111111".

The above description is given as an example and it should be clearly understood that various modifications may be made without going beyond the scope of the present invention.

Figure 9:
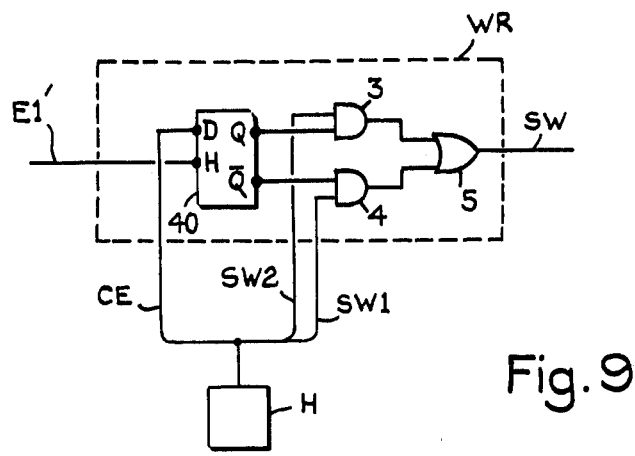
FIG. 9 is a diagram of a variant of the write circuit.

Thus the write circuit may be produced in a manner different from that shown in FIG. 9. The configuration shown in FIG. 9 is satisfactory only if the duration of the glitch effect is short with respect to the restored signal periods or the local clock signals. It is constituted essentially by flip-flop 40 which controls the same switching circuit contained in the circuit shown in FIG. 5, i.e. the circuit consisting of gates 3, 4 and 5. Input H of this flip-flop is connected to input E1', and input D is connected to wire CE.

Figure 10:
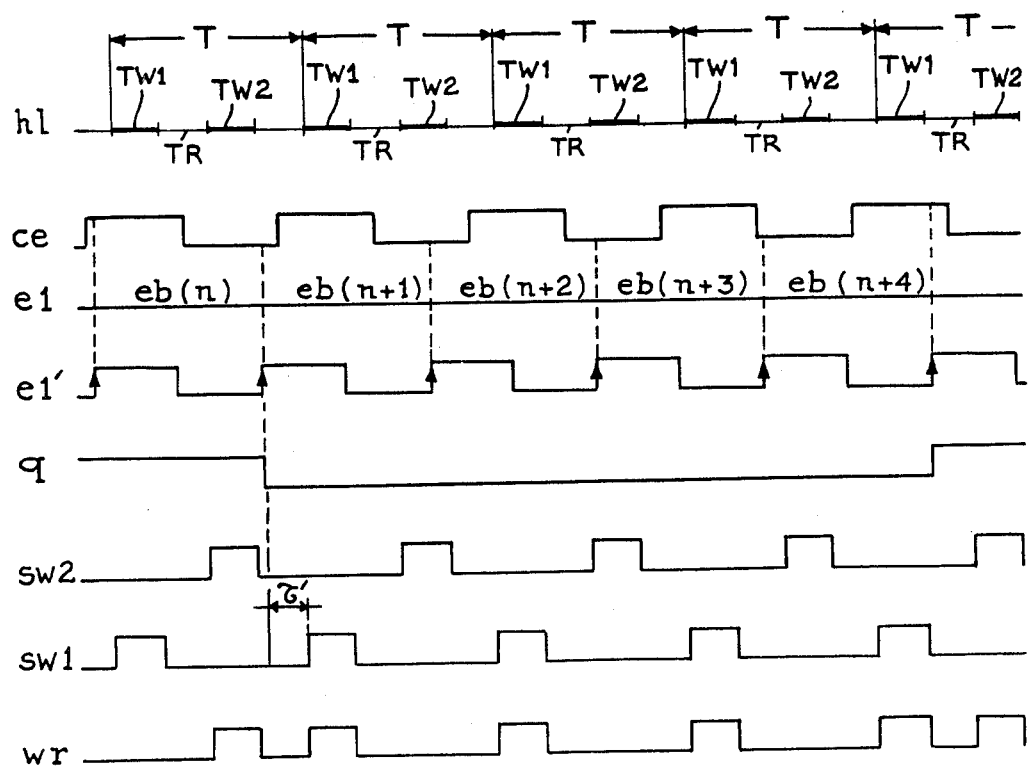
FIG. 10 is a timing diagram to help explain the operation of the variant of FIG. 9.

The operation of this circuit is illustrated by FIG. 10. The lines having the same references as in FIGS. 3 and 4 have the same meanings. Signal e1' is a restored clock signal synchronous with the appearance of bits eb(n) to eb(n+4) appearing on terminal e1. The instants at which signal q produced by flip-flop 40 changes sign are determined by the rising edges of signal e1', and the value of signal q depends on the value at the same instants of signal ce. This signal q determines whether signal sw1 or sw2 is present on output SW of the wire circuit WR. It is seen that in the latter case, the glitch effect cannot last more than the time $\tau 40$ between the rising edge of signal e1' and the rising edge of signal sw1.

We claim:

1. A digital data resynchronizing circuit, which comprises:

n input circuits, n≧1, each having a first input terminal for receiving binary data in serial form at the rate of clock signals received at a second input terminal;

a first output terminal for deriving the resynchronized data at the rate of a local clock circuit;

n input memory circuits, the data input and output of each memory circuit being respectively connected to the first input and output terminals of the corresponding input circuit;

n write-address code circuits, each associated with a corresponding input memory circuit and incremented at the rate of said received clock signals; and n read-address code circuits each associated with a corresponding input memory circuit and incre-

TABLE II

| Input Variables | | | | | | | | | Output Variables | | | | | | Remarks |
|---|---|---|---|---|---|---|---|---|---|---|---|---|---|---|---|
| itk5 | itk4 | itk3 | itk2 | itk1 | itk0 | sdb | cstR | sdt | itk5' | itk4' | itk3' | itk2' | itk1' | itk0' | |
| 0 | 0 | 0 | 0 | 0 | 0 | 0 | 0 | 0 | 0 | 0 | 0 | 0 | 0 | 1 | |
| 0 | 0 | 0 | 0 | 0 | 1 | 0 | 0 | 0 | 0 | 0 | 0 | 0 | 1 | 0 | Count cycle |
| 0 | 0 | 0 | 0 | 1 | 0 | 0 | 0 | 0 | 0 | 0 | 0 | 0 | 1 | 1 | |
| 1 | 1 | 1 | 1 | 1 | 0 | 0 | 0 | 0 | 1 | 1 | 1 | 1 | 1 | 1 | |
| 1 | 1 | 1 | 1 | 1 | 1 | 0 | 0 | 0 | 0 | 0 | 0 | 0 | 0 | 0 | |
| X | X | X | X | X | X | 1 | 0 | 0 | 0 | 0 | 0 | 0 | 0 | 0 | Set to 0 |
| X | X | X | X | X | X | 0 | 1 | 0 | 0 | 0 | 0 | 0 | 0 | 1 | Set to 1 |
| 1 | 1 | 1 | 1 | 1 | 1 | 0 | 0 | 1 | 1 | 0 | 0 | 0 | 0 | 0 | |
| 0 | 0 | 0 | 0 | 0 | 0 | 0 | 0 | 1 | 1 | 0 | 0 | 0 | 0 | 1 | The number 32 is |
| 0 | 0 | 0 | 0 | 0 | 1 | 0 | 0 | 1 | 1 | 0 | 0 | 0 | 1 | 0 | added to the incoming |
| 0 | 1 | 1 | 1 | 1 | 0 | 0 | 0 | 1 | 1 | 1 | 1 | 1 | 1 | 1 | code (frame skip) to |
| 0 | 1 | 1 | 1 | 1 | 1 | 0 | 0 | 1 | 0 | 0 | 0 | 0 | 0 | 0 | which is added 1 in |
| 1 | 0 | 0 | 0 | 0 | 0 | 0 | 0 | 1 | 0 | 0 | 0 | 0 | 0 | 1 | order to increment |
| 1 | 0 | 0 | 0 | 0 | 1 | 0 | 0 | 1 | 0 | 0 | 0 | 0 | 1 | 0 | the counter |
| 1 | 1 | 1 | 1 | 1 | 0 | 0 | 0 | 1 | 0 | 1 | 1 | 1 | 1 | 1 | | mented at the rate of said local clock, characterized in that each of said input memory circuits is implemented as a m×1 bit memory, m>1, and said circuit further comprises:

n write circuits for enabling write operations in a corresponding input memory circuit during at least two time slots of the local clock cycle;

n read circuits for controlling the read operations in a corresponding imput memory circuit during another time slot of said local clock cycle; and n code difference circuits for ensuring that the read and write address codes for a corresponding input memory circuit are different.

2. The resynchronizing circuit according to claim 1 wherein said binary data is arranged in frames and identified by frame codes, the outputs of said n input memory circuits are connected to said first output terminal via a multiplexing circuit synchronized with said local clock, said resynchronization circuit being further characterized by:

a frame code synchronization detector connected to the output of said multiplexing circuit;

a sequential synchronization circuit connected to said frame detector;

a sequential identification code circuit for producing on a second output terminal the frame identification codes of the resynchronized data; and a memory circuit connected to the outputs of said sequential identification code circuit and said sequential synchronization circuit for storing data relative to the instantaneous states thereof, the address codes for said memory circuit being generated by said local clock in correspondence with the control signals for said multiplexing circuit.

3. The resynchronization circuit according to claim 1 characterized in that each of said write-circuits includes:

a frequency-divider circuit;

a first flip-flop circuit having its switching input connected to the output of said frequency-divider thence to said second input terminal;

a second flip-flop having its switching input connected to the output of said frequency divider via an inverter, the data input of said first flip-flop being connected to the output of said local clock, the data input of said second flip-flop being connected to the output of said first flip-flop; and a switching circuit connected to the output of said second flip-flop for generating on the output of said write circuit a pulse coinciding with either a first or a second write interval.

4. The resynchronizing circuit according to claim 1 characterized in that each of said write circuits includes:

a flip-flop circuit having a switching input connected to said second input terminal and a data input connected to the output of said local clock; and a switching circuit having a control input connected to the output of said flip-flop for generating on the output of said write circuit a pulse coinciding with either a first or a second write interval.

5. A resynchronization circuit according to claim 1 characterized in that each of said read circuits includes a shift register comprising at least one flip-flop whose input is connected to the output of said input memory circuit and whose read-enable input is connected to said clock thereby to receive signals corresponding to the read intervals.

6. A resynchronization circuit according to claim 2 characterized in that said sequential identification code circuit comprises a read-only memory (ROM).

7. A resynchronization circuit according to claim 2 characterized in that said sequential synchronization circuit comprises a read-only memory (ROM).

8. A resynchronization circuit according to claim 2 characterized in that each of said code difference circuits comprises:

a first decoder circuit connected to said write-address code circuit;

a second decoder circuit connected to said read-address code circuit; and a coincidence gate connected to the outputs of said first and second decoder circuits for feeding a signal to one of said address code circuits when a signal is present on both of said decoder outputs thereby to set the address code circuit to a predetermined code.

* * * * *